United States Patent
Kinscher et al.

(10) Patent No.: US 10,121,578 B2
(45) Date of Patent: Nov. 6, 2018

(54) ELECTROMAGNETIC ACTUATING DEVICE

(71) Applicant: Schaeffler Technologies AG & Co. KG, Herzogenaurach (DE)

(72) Inventors: Markus Kinscher, Lauf a.d. Pegnitz (DE); Jens Hoppe, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/306,410

(22) PCT Filed: Mar. 6, 2015

(86) PCT No.: PCT/DE2015/200125
§ 371 (c)(1),
(2) Date: Oct. 24, 2016

(87) PCT Pub. No.: WO2015/165446
PCT Pub. Date: Nov. 5, 2015

(65) Prior Publication Data
US 2017/0047153 A1    Feb. 16, 2017

(30) Foreign Application Priority Data
Apr. 29, 2014   (DE) .................. 10 2014 207 988

(51) Int. Cl.
*H01F 7/08* (2006.01)
*H01F 3/00* (2006.01)
(Continued)

(52) U.S. Cl.
CPC ......... *H01F 7/081* (2013.01); *F16K 31/0675* (2013.01); *H01F 3/00* (2013.01);
(Continued)

(58) Field of Classification Search
CPC . H01F 3/00; H01F 7/081; H01F 7/121; H01F 7/1607; H01F 2007/1661; F16K 31/0675
(Continued)

(56) References Cited

U.S. PATENT DOCUMENTS 4,783,051 A   11/1988 Gibas
7,959,128 B2   1/2011 Hoppe et al.
(Continued)

FOREIGN PATENT DOCUMENTS

DE   3700540   7/1988
DE   9005411   8/1990
(Continued)

*Primary Examiner* — Shawki S Ismail
*Assistant Examiner* — Lisa Homza
(74) *Attorney, Agent, or Firm* — Davidson, Davidson & Kappel, LLC

(57) ABSTRACT

A electromagnetic actuating device for a valve, having an armature arranged in a hollow cylindrical armature chamber axially displaceable between two axial stops, wherein the armature chamber is delimited by a magnet yoke. An electrical coil extends coaxially around the armature, and the magnet yoke is at least partially arranged in a housing. The armature has a cylindrical geometry with a base remote from the housing and with a hollow cylindrical end section situated axially opposite. The base is remote from the housing and connected to an actuating plunger. A guide sleeve is mounted axially onto the hollow cylindrical end section of the armature, and on that end of the guide sleeve which is remote from the actuating plunger, there is arranged or formed an adhesion prevention device which prevents or at least greatly impedes axial adhesion of the armature to the magnet yoke. The guide sleeve makes it possible to realize a reduction in width of the parasitic air gap between the armature and the magnet yoke in order to increase the
(Continued)

actuating forces of the actuating device with simultaneously reduced number of components.

20 Claims, 3 Drawing Sheets

(51) Int. Cl.
    *F16K 31/06*     (2006.01)
    *H01F 7/121*     (2006.01)
    *H01F 7/16*     (2006.01)

(52) U.S. Cl.
    CPC ........... *H01F 7/121* (2013.01); *H01F 7/1607* (2013.01); *H01F 2007/1661* (2013.01)

(58) Field of Classification Search
    USPC ........................................................ 335/261
    See application file for complete search history.

(56) References Cited

U.S. PATENT DOCUMENTS

| | | | |
|---|---|---|---|
| 8,899,198 B2 | 12/2014 | Hoppe et al. | |
| 2008/0245983 A1* | 10/2008 | Hoppe | F01L 1/3442 251/65 |
| 2009/0200502 A1* | 8/2009 | Hoppe | F01L 1/34 251/129.15 |
| 2010/0025606 A1* | 2/2010 | Hoppe | H01F 7/128 251/129.15 |
| 2010/0163128 A1* | 7/2010 | Kinscher | F16K 27/041 137/625.64 |
| 2011/0084018 A1* | 4/2011 | Hoppe | B01D 29/111 210/495 |
| 2011/0121218 A1* | 5/2011 | Hoppe | H01F 7/081 251/129.15 |
| 2011/0204269 A1* | 8/2011 | Hoppe | F16K 31/061 251/129.01 |
| 2011/0220826 A1* | 9/2011 | Hoppe | F01L 1/3442 251/129.15 |
| 2011/0285484 A1* | 11/2011 | Hoppe | H01F 7/081 335/229 |
| 2012/0312262 A1* | 12/2012 | Hoppe | F01L 1/3442 123/90.17 |

FOREIGN PATENT DOCUMENTS

| | | |
|---|---|---|
| DE | 19525384 | 1/1997 |
| DE | 19823968 | 12/1999 |
| DE | 102005048732 | 4/2007 |
| DE | 102009051310 | 5/2011 |
| WO | WO08700903 | 2/1987 |
| WO | WO 2010/009 966 A1 | 1/2010 |

* cited by examiner

ELECTROMAGNETIC ACTUATING DEVICE

The present invention relates to an electromagnetic actuating device for a valve, including an armature which is axially movably situated in a hollow cylindrical armature chamber between two axial stops, in which the armature chamber is delimited by a magnet yoke, in which an electrical coil coaxially encompasses the armature, and in which the magnet yoke is at least partially situated in a housing.

BACKGROUND

Electromagnetically actuatable valves are used in various areas of technology. For example, such valves are necessary for the operation of modern braking systems, hydraulic camshaft adjusting devices or automatic transmissions in motor vehicles. The armature of an electromagnetic actuating device necessary for mechanically actuating the setting piston of such a valve is in this instance, for example, axially movably mounted in an armature guide tube. Alternatively, it is known to provide the armature radially outside with sliding rings and to axially movably situate the armature within a guide cylinder.

The publication WO 2010/009 966 A1 describes an electromagnetic actuating device for a hydraulic control valve of a camshaft adjusting device. This adjusting device has an armature and a first and a second magnet yoke, each of which has a cup-shaped geometry. The first and the second magnet yoke are situated one after the other and in such a way that their open ends face each other. In this instance, the two magnet yokes keep an axial distance to each other so that a ring-shaped air gap is formed between the magnet yokes. Moreover, the two magnet yokes radially inside delimit at least one armature chamber in which the armature is accommodated in an axially movable manner. At a first axial end section of the cylindrical armature facing the first magnet yoke, an axially projecting stop sleeve is inserted into a centric through-hole of the armature, with the aid of which an axial adhesion of the armature to the first magnet yoke is preventable. With the aid of a sliding ring accommodated in a ring groove of the armature, the first axial end section of the armature is radially mounted at an inner circumferential surface of the first magnet yoke. In a second end section of the cylindrical armature directed away from the first end section, a plunger is attached in a through-hole. This plunger is axially movably accommodated in a sliding sleeve and by its free end acts upon an actuator piston of the hydraulic control valve. The sliding sleeve is attached in a coaxial hole within the base of the second cup-shaped magnet yoke. As a result, the armature is axially on both sides radially mounted in the armature chamber.

Even though this electromagnetic actuating device is quite advantageously constructed, it still has the disadvantage that, in order to prevent the axial adhesion of the armature to the base of the first cup-shaped magnet yoke, a stop sleeve is attached at the armature and a sliding ring is situated in a ring groove of the armature for radially mounting the armature in the armature chamber. Moreover, the sliding ring causes an enlargement of the necessary radial installation space of the actuating device, and the sliding ring may have disadvantageous production-related dimensional deviations. Furthermore, the sliding ring enlarges a comparably large radial, parasitic air gap within the electromagnetic actuating device.

SUMMARY OF THE INVENTION

It is an object of the present invention to provide an electromagnetic actuating device which makes do with a reduced quantity of components and which makes enables generation of higher actuating forces than a generic actuating device having a sliding ring at the armature.

The present invention is directed to the finding that for an electromagnetic actuating device in particular larger radial, parasitic air gaps have a negative effect on the achievable mechanical actuating forces, so that it would be advantageous if these air gaps were able to be reduced. According to the present invention, this finding is used in that the armature is guided radially in the magnet yoke with the aid of a guide sleeve, the guide sleeve at the same time having an anti-adhesion device which prevents, or at least greatly impedes, an adhesion of the armature at the base of the cup-shaped magnet yoke.

For this reason, the present invention relates to an electromagnetic actuating device for a valve, including an armature which is axially movably situated in a hollow cylindrical armature chamber between two axial stops, in which the armature chamber is delimited by a magnet yoke, in which an electrical coil coaxially encompasses the armature, and in which the magnet yoke is at least partially situated in a housing. For achieving the underlying object, it is provided for this actuating device that the armature has a cylindrical geometry including a base remote from the housing and a hollow cylindrical end section being axially diametrically opposed, that the base remote from the housing of the armature is connected to an actuating plunger, that a guide sleeve is axially fitted onto the hollow cylindrical end section of the armature, and that an anti-adhesion device is situated or formed at the end of the guide sleeve remote from the actuating plunger, preventing or at least greatly impeding an axial adhesion of the armature to the magnet yoke.

Since the guide sleeve may be manufactured with a very high dimensional accuracy, for the actuating device configured according to the present invention, the parasitic air gap between the cylindrical outer circumferential surface of the armature and the cylindrical inner circumferential surface of the magnet yoke surrounding the outer circumferential surface is significantly smaller than when using a sliding ring, such as for the mentioned actuating device according to WO 2010/009 966 A1. As a result, significantly higher actuating forces of the electromagnetic actuating device may be generated with an equal input of energy or a reduced energy consumption may be implemented for equally great actuating forces. Moreover, compared to the actuating device according to WO 2010/009 966 A1, the quantity of functionally necessary components has been reduced, which ultimately results in a reduction in manufacturing costs.

The guide sleeve has dual functionality since, beside its guiding function, it simultaneously at the end face prevents a magnetic adhesion of the armature to the magnet yoke. In one example, the guide sleeve has a length of approximately 1.0 cm to 1.5 cm, with a wall thickness of preferably less than 1.5 mm. By appropriately energizing the coil, an equilibrium between the electromagnetic force acting upon the armature and a mechanical actuating force re-acting from a valve or the like upon the actuating plunger is able to be achieved so that the armature may assume any position between the two axial stops with high positioning accuracy.

According to one refinement of the actuating device, it is provided that the guide sleeve includes a guiding section for radially guiding the armature at the cylindrical inner circumferential surface of the magnet yoke and an axially adjacent attachment section for attaching the guide sleeve to the radial outside of the armature. Accordingly, the axial length of the guide sleeve is not completely used for guiding the armature during an axial movement in the armature chamber, rather, a part of the axial length of the guide sleeve is provided to fasten the guide sleeve to the outer circumferential surface of the armature. This will be discussed in greater detail when describing an exemplary embodiment.

Another refinement provides that the anti-adhesion device includes at the end of the guide sleeve remote to the plunger a radially inwardly directed, at least in sections annularly circumferential contact section, which includes at least one elevation facing away from the armature, with the aid of which an adhesion at the end face of the armature to the first stop formed at the magnet yoke is prevented or at least greatly impeded.

Accordingly, the anti-adhesion device of the guide sleeve is formed by a radially inwardly directed ring-shaped flange integrally formed at the hollow cylindrical guide sleeve. This annularly circumferential contact section or flange and the cylindrical section of the guide sleeve are, for example, set at an angle α of approximately 90° to each other.

Alternatively, the anti-adhesion device may also be implemented by at least three radially inwardly directed and integrally formed webs or the like at the end of the guide sleeve.

Furthermore, the magnet yoke is preferably configured as two parts, including a first magnet yoke segment and a second magnet yoke segment, the first magnet yoke segment being formed in a dual cup-shaped manner and has radially inside a cup-shaped geometry, the cup space of which forms a cylindrical armature chamber for axially movably accommodating the armature, the first magnet yoke segment forming radially outside of the armature chamber an axially open toroidal accommodating space for accommodating the coil, which at its open axial end is closed off by the second magnet yoke segment, and that the coil is situated in this toroidal accommodating space.

Due to the multipart configuration of the magnet yoke or the armature housing, the coil formed with an encapsulated winding may be installed in the electromagnetic actuating device in a simple manner with respect to manufacturing. The complex geometric design of the first, dual cup-shaped magnet yoke segment may be manufactured, for example, by sintering a powdered material having little magnetic conductivity.

The first stop for delimiting the axial movement of the armature is preferably formed by the base of the first magnet yoke segment near the housing, which axially delimits the armature chamber. Hereby, a structurally particularly simple setup results since the first magnet yoke segment forms the axial stop without additional components.

Another advantageous refinement of the present invention provides that the actuating plunger is axially movably accommodated in a sliding sleeve which is attached in a bore hole coaxial to the actuating plunger of a magnetizable bearing block, the discoidally formed bearing block being attached in the first magnet yoke segment in a bore hole coaxial to the actuating plunger, and in which the bearing block closes off the armature chamber at the side of the actuating plunger and forms the second axial stop for the armature.

This structure implements a reliable, dually determined axial bearing of the armature. Moreover, the magnetizable bearing block serves for guiding at least a portion of the magnetic flow originating from the coil. The bore hole in the first magnet yoke segment, in which the bearing block is attached, is preferably the cylindrical inner circumferential surface of the first magnet yoke segment in the area of an annular base of the first magnet yoke segment remote from the guide sleeve. There, the bearing block is attached in the axial and radial direction, for example, by pressing, welding, soldering, screwing, adhesive bonding or the like. Moreover, the bearing block is preferably axially flush with the annular end face of the base of the first magnet yoke segment remote from the housing.

According to another advantageous refinement of the present invention, it is provided that the guide sleeve is integrally manufactured from a metallic material, in particular, using the deep-drawing method. This deep-drawing method implements a manufacture of the guide sleeve in a series-production suitable manner, a cost-effective manner and, at the same time, a dimensionally extremely accurate manner. The manufacture of the guide sleeve may, for example, be carried out by deep-drawing an annular or circular sheet metal blank, in the case of the circular blank an additional punching step for configuring the, in the simplest case, annular flange for the anti-adhesion device being possibly necessary.

One further specific embodiment preferably provides that in the area of the guiding section of the guide sleeve the outer diameter of the armature is smaller than the inner diameter of the guide sleeve. This armature optionally radially constricted in the area of the attachment section of the guide sleeve forms a ring-shaped cavity between the outer circumferential surface of the armature and an interior wall surface of the guiding section of the guide sleeve, which may, for example, be filled up by an adhesive to further optimize the attachment of the guide sleeve to the armature. The outer diameter of the armature is in the area of the attachment section of the guide sleeve equally great or greater than the inner diameter of the guide sleeve so that a connection of these two components takes place there with the aid of a press-fit.

Moreover, it may be provided that in the attachment section of the guide sleeve the material thickness and the outer diameter of the guide sleeve are reduced compared to the material thickness of the remaining guide sleeve. As a consequence of the resulting negligible radial clearance of the guide sleeve in relation to the inner circumferential surface of the first magnet yoke segment, the frictional resistance of the guide sleeve is reduced and concomitantly significantly improves the positioning accuracy of the armature within the armature housing or the magnet yoke. The reduced material thickness may be implemented by a material stretching in the course of the mentioned deep-drawing process.

According to one further specific embodiment of the present invention, it is provided that the attachment section of the guide sleeve is rotationally and tensionally fixedly connected to the armature. The mechanically permanent connection between the attachment section of the guide sleeve and the cylindrical armature may, for example, take place by a press-fit, injecting, caulking, thermal shrinking, welding, frictional welding, soldering, adhesive bonding or a combination of at least two of the mentioned joining methods.

To further increase the strength of the connection between the armature and the guide sleeve, a form-locked connection between the armature and the guide sleeve may at least in areas be additionally or alternatively provided. This form-locked connection may, for example, be implemented by radially projecting latching projections which engage using complementarily configured depressions and/or recesses at the guide sleeve. Furthermore, the armature may be provided with micro-teeth or other projections of minimal heights, the tips of which impress in the course of the installation process in the area of the attachment section of the guide sleeve in its inner circumferential surface and thus in areas establish a form-locking connection.

In a further advantageous specific embodiment, a negligible radial distance is present between the preferred cylindrical inner circumferential surface of the armature chamber and an outer circumferential surface of the guiding section of the guide sleeve. Due to the minimal play of approximately 0.1 mm present in this area, the armature is smoothly axially movable within the armature chamber.

According to another refinement of the electromagnetic actuating device, the guide sleeve is made of an anti-magnetic material and the bearing block of a magnetizable substance. For this reason, a magnetic influence on the magnetic flow generated from the coil or its winding by way of the guide sleeve and a reduction of the actuating force generated with the aid of the actuating device are prevented. The anti-magnetic material may be a suitable metal or a plastic material. The guide sleeve is preferably integrally formed. At least a portion of the magnetic flow generated by the coil may be conducted in a low-loss manner via the bearing block configured as a type of pole core using the magnetizable substance.

BRIEF DESCRIPTION OF THE DRAWINGS

To better understand the present invention, an exemplary embodiment is subsequently described on the basis of the appended drawings.

DETAILED DESCRIPTION

Figure 1:
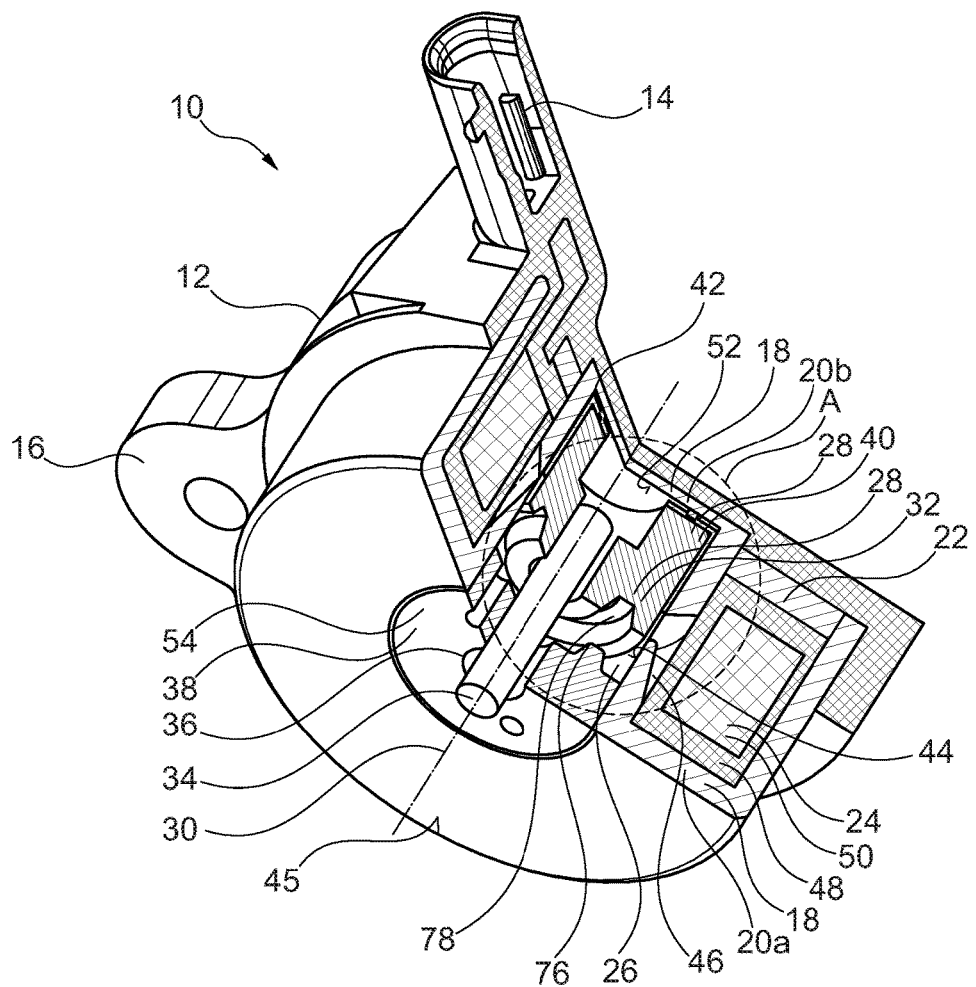
FIG. 1 shows a partially sectioned perspective view of an electromagnetic actuating device configured according to the present invention.

Electromagnetic actuating device 10, for example, for a hydraulic or pneumatic valve here not shown has a housing 12 formed in a cup-shaped manner, including a two-pin plug connector 14 and at least one attachment flange 16 integrally formed at housing 12. A through-hole, into which a fastening screw is insertable, is formed in attachment flange 16.

A two-part magnet yoke, which is made up of a first magnet yoke segment 18 and a second magnet yoke segment 22, is axially partially inserted into housing 12. First magnet yoke segment 18 is formed in a dual cup-shaped manner and, in this instance, has a radial outer disc-shaped base 20a at its axial end remote from the housing and a radial inner circular base 20b at its end near the housing. First magnet yoke segment 18 partially axially projects from housing 12, while second magnet yoke segment 22 is situated within the cup space of housing 12 and, to accommodate an electrical coil 24, near the housing base axially closes off a toroidal accommodating space 46 of first magnet yoke segment 18. Toroidal accommodating space 46 for accommodating electrical coil 24 is, for the chosen definition, formed by the radial outer cup of dual cup-shaped first magnet yoke segment 18.

First magnet yoke segment 18 and second magnet yoke segment 22 are used, inter alia, for the low-loss guidance of a magnetic flow generated by winding 50 of ring-shaped coil 24. Moreover, first magnet yoke segment 18 forms radially inside a cylindrical armature chamber 26 for accommodating an armature 28. Armature 28 has a cylindrical geometry including a radially stepped base 32 at the end face and a hollow cylindrical end section 40 located axially diametrically opposed. Radially stepped base 32 has a centric axial bore hole in which a cylindrical actuating plunger 34 is attached. Actuating plunger 34 using its free axial end acts upon a not-shown piston of the already mentioned hydraulic or pneumatic valve.

Actuating plunger 34 is axially movably accommodated in a sliding sleeve 36 along centric longitudinal axis 30 of actuating device 10, sliding sleeve 36 being situated in an axial bore hole of a disc-shaped bearing block 38 made of a magnetizable material. A guide sleeve 42 essentially formed in a ring-shaped manner is in the axial and radial direction permanently attached to hollow cylindrical end section 40 of armature 28 facing away from radially stepped base 32 or from actuating plunger 36.

First magnet yoke segment 18 in its radial inner cup forms already-mentioned armature chamber 26 radially delimited by a cylindrical inner circumferential surface 44 of first magnet yoke segment 18. For axial movability, armature 28 is radially guided with the aid of guide sleeve 42 at this inner circumferential surface 44.

Hollow cylindrical bearing block 38 at the circumferential side is situated at axially extended inner circumferential surface 44 of first magnet yoke segment 18 and is suitably rotationally and movably fixed to the inner circumferential surface of the first magnet yoke segment. As illustrated, bearing block 38 by its side remote from the armature chamber is flush with an annular end face 45 formed at base 20a of first magnet yoke segment 18 remote from the housing.

It is apparent that the two magnet yoke segments 18, 22 encompass toroidal accommodating space 46 which has a quadrangular cross-sectional geometry and serves to accommodate ring-shaped coil 24 wrapped by copper wire, which is surrounded by a sealing compound 48 for forming a winding 50 and for protection from environmental influences.

Circular base 20b of first magnet yoke segment 18 near the housing forms a first axial stop 52 near the housing to delimit the axial movability of armature 28, while bearing block 38 attached at first magnet yoke segment 18 forms a second axial stop 54 remote from the housing for armature 28. Axial stop 54 remote from the housing is formed at bearing block 38 specifically by a ring-shaped axial extension 76 which points to armature 28 and, when merging armature 28 and bearing block 38, engages in a centering manner in an assigned ring-shaped groove 78 in radially stepped base 32 of armature 28.

With the aid of actuating plunger 34 guided in sliding sleeve 36 and via guide sleeve 42, armature 28 is twice radially mounted.

Figure 2:
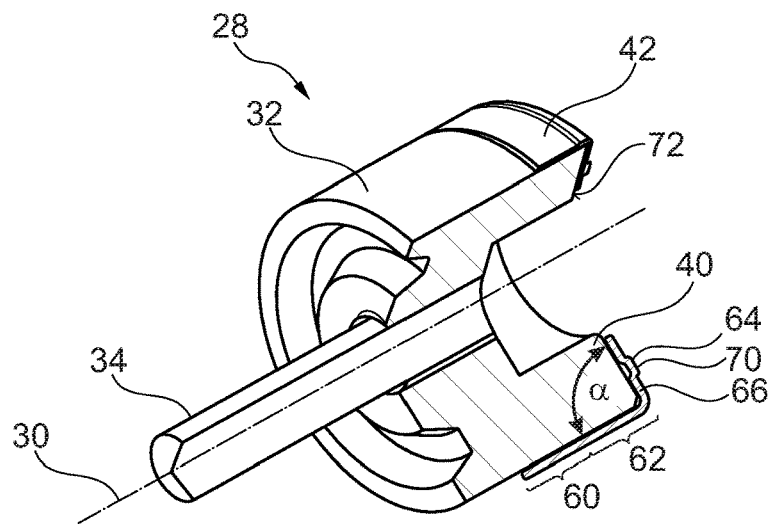
FIG. 2 shows a partially sectioned perspective view of the armature including a guide sleeve attached thereto of the actuating device according to FIG. 1.

FIG. 2 shows a partially sectioned perspective view of armature 28 including guide sleeve 42 attached thereto. Guide sleeve 42 mounted onto hollow cylindrical end section 40 of armature 28 has an attachment section 60 at which a guiding section 62 is axially adjacent to the area of hollow cylindrical end section 40 of armature 28. This guiding section is, with the aid of attachment section 60 of guide sleeve 42, mechanically fixedly connected to armature 28. Furthermore, the essentially hollow cylindrical guide sleeve 42 includes an anti-adhesion device 64 at the side of the housing base, preferably integrally formed with respect to the guide sleeve and to armature 28, which prevents a magnetic adhesion of armature 28 at housing-side base 20b of first magnet yoke segment 18 in the first stop position according to FIG. 1.

In the exemplary specific embodiment shown in FIG. 2, anti-adhesion device 64 is formed at radially inwardly directed, annular contact section 66, into which a ring-shaped elevation 70 extending axially in the direction of base 20b of first magnet yoke segment 18 near the housing is introduced. Compared to the remaining area of contact section 66 of guide sleeve 42, this ring-shaped elevation 70 has a comparatively small area. As a result, the magnetic adhesion of guide sleeve 42 or of armature 28 to base 20b is reliably prevented or at least significantly impeded.

In this case, annular contact section 66 of guide sleeve 42 almost completely covers an annular end face 72 of armature 28 facing away from base 32 of armature 28 remote from the housing. An angle α between contact section 66 of guide sleeve 42 and guiding section 62 of guide sleeve 42 or longitudinal axis 30 of actuating device 10 is approximately 90°.

Ring-shaped elevation 70 may, for example, be impressed in the form of a bead into guide sleeve 42 or also be designed only in areas, for example, in the form of at least two webs, stop arms or the like. Alternatively, angle α may be greater than 90° so that contact section 66 runs in a conically inclined manner and the forming of the additional elevation 70 potentially becomes dispensable.

Figure 3:
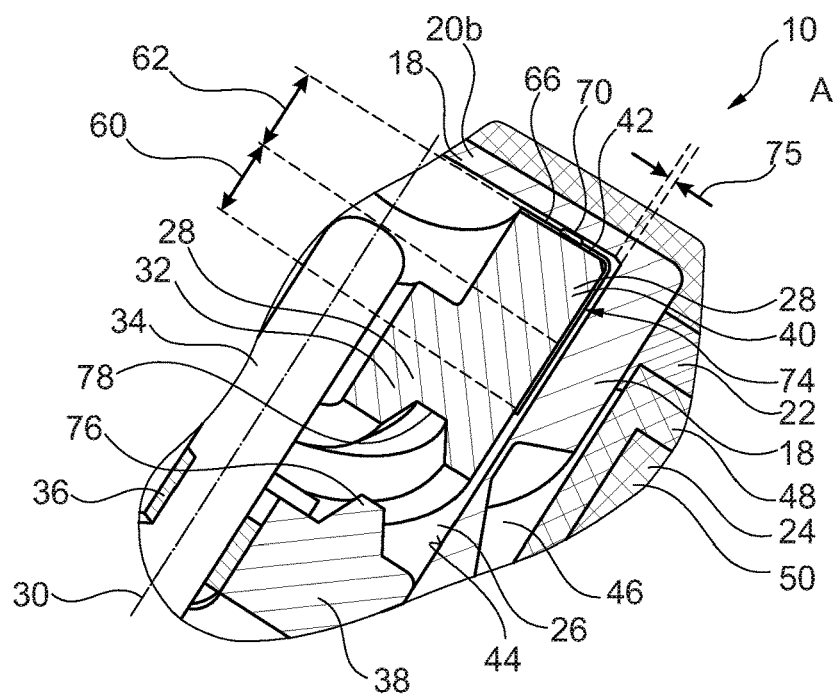
FIG. 3 shows an enlarged view A of FIG. 1 in the area of the guide sleeve.

FIG. 3 shows a greatly enlarged view of detail A from FIG. 1. Actuating plunger 34 of armature 28 of actuating device 10 is along longitudinal axis 30 of actuating device 10 axially moveably accommodated in sliding sleeve 36 which, for its part, is axially and radially fixed in bearing block 38. Guide sleeve 42 is fixedly connected to armature 28 via its attachment section 60 and, moreover, with the aid of its guiding section 62 parallel to longitudinal axis 30 axially moveably radially mounted at inner circumferential surface 44 of armature chamber 26 or first magnet yoke segment 18. A magnetic adhesion of armature 28 at base 20b of first magnet yoke segment 18 is prevented with the aid of contact section 66 of guide sleeve 42 and elevation 70 formed thereon having a very small area. It is also apparent in FIG. 3 that second magnet yoke segment 22 is adjacent in a perpendicularly aligned manner to first magnet yoke segment 18 and that it covers accommodating space 46 for coil 24 axially in the direction of housing 12.

In this exemplary embodiment, a negligible radial distance 75 (radial play) of up to approximately 0.1 millimeter is provided between an outer circumferential surface 74 of guiding section 62 of guide sleeve 42 and of inner circumferential surface 44 of first magnet yoke segment 18 to ensure in this way a smooth axial movability of armature 28 within armature chamber 26 and to concomitantly achieve a particularly refined actuating behavior of electromagnetic actuating device 10.

Figure 4:
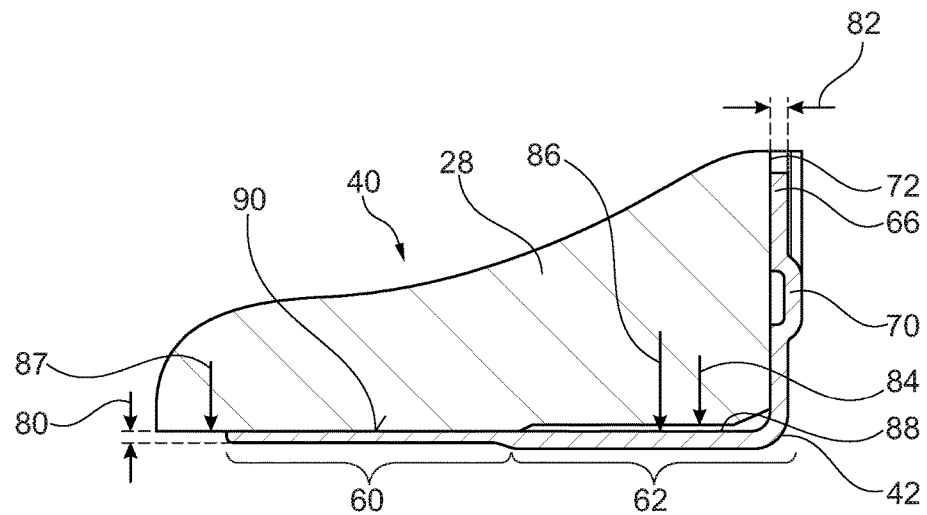
FIG. 4 shows an enlarged partial longitudinal section through the housing-side end section of the armature having the fitted guide sleeve.

FIG. 4 shows a greatly enlarged partial longitudinal section through end section 40 of armature 28 near the housing including guide sleeve 42 mounted there. Guide sleeve 42 rests permanently fixedly including its attachment section 60 with its inner circumferential surface 90 on the outside of armature 28. Material thickness 80 of guide sleeve 42 in attachment section 60 is, compared to material thickness 82 of remaining guide sleeve 42, apparently slightly reduced. Furthermore, outer diameter 84 of armature 28 in the area of guiding section 62 of guide sleeve 42 is negligibly smaller than an inner diameter 86 of guide sleeve 42 to form in the area of guiding section 62 a cylindrical cavity 88 having a small volume. This cavity 88 may, for example, serve for accommodating an adhesive, solder, filling material or the like to further optimize the mechanical connection between guide sleeve 42 and armature 28. Outer diameter 87 of armature 28 is in the area of attachment section 60 of guide sleeve 42 equally large or smaller (press-fit) than inner diameter 86 of guide sleeve 42.

The high-strength mechanical connection between attachment section 60 of guide sleeve 42 and cylindrical armature 28 may, for example, be established by a press-fit, impressing, caulking, thermal shrinking, welding, frictional welding, soldering, adhesive bonding or a combination of at least two of the mentioned joining methods. To further increase the mechanical strength of the connection between armature 28 and guide sleeve 42, a form-locked connection between armature 28 and guide sleeve 42 may at least in areas be additionally or alternatively provided. This may, for example, be implemented by radially, outwardly directed projections of minimal height at armature 28, which may be engaged in complementarily configured depressions and/or recesses of guide sleeve 42. Furthermore, armature 28 may be provided with micro-teeth, knurlings, corrugations or other projections of minimal heights, the tips of which impress in the course of the installation process of attachment section 60 of guide sleeve 42 into inner circumferential surface 90 of guide sleeve 42 and, thus, establish at least in areas a form-locked, high-strength mechanical connection. As a result, even with a great number of axial movements of armature 28 of electromagnetic actuating device 10, an absolutely fixed fit of guide sleeve 42 on armature 28 is ensured.

Figure 5:
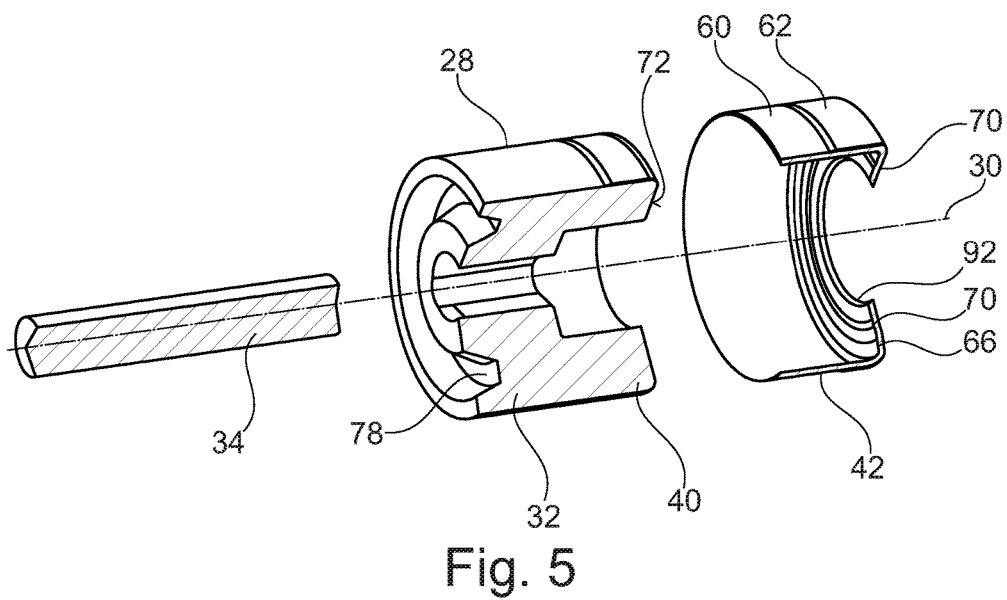
FIG. 5 shows a partially sectioned and exploded perspective view of a plunger, of the armature and of the guide sleeve.

FIG. 5 shows a partially sectioned and axially exploded perspective view of actuating plunger 34, of armature 28 and of guide sleeve 42 of not yet assembled electromagnetic actuating device 10. Cylindrical armature 28 in the area of its radially stepped base 32 is firmly connectable to actuating plunger 34. Attachment section 60 of guide sleeve 42 is mounted onto hollow cylindrical end section 40 of armature 28 and is there permanently attached. Annular contact section 66 of guide sleeve 42 including its ring-shaped elevation 70 in the installed position preferably contacts over its entire area end face 72 of armature 28 near the housing.

Due to the annular geometry of contact section 66 of guide sleeve 42, an annular access opening 92 at guide sleeve 42 results centrically to longitudinal axis 30, which, on the one hand, has a material- and weight-saving effect and, on the other hand, simplifies access to the interior of armature 28.

LIST OF REFERENCE NUMERALS 10 electromagnetic actuating device
12 housing of the actuating device
14 electrical plug connector
16 attachment flange
18 first magnet yoke segment
20a base of the first magnet yoke segment remote from the housing
20b base of the first magnet yoke segment near the housing
22 second magnet yoke segment
24 ring-shaped coil
26 armature chamber
28 armature
30 longitudinal axis of the actuating device
32 radially stepped base of the armature 34 actuating plunger
36 sliding sleeve
38 bearing block, pole core
40 hollow cylindrical end section of the armature
42 guide sleeve
44 inner circumferential surface of the first magnet yoke segment
45 end face at base 20a of the first magnet yoke segment
46 toroidal accommodating space for the coil.
48 sealing compound
50 winding of coil
52 first axial stop
54 second axial stop
60 attachment section
62 guiding section
64 anti-adhesion device
66 contact section, flange
70 axial elevation at the contact section
72 end face of the armature near the housing
74 outer circumferential surface of the guiding section of the guide sleeve
75 radial distance between the guide sleeve and inner circumferential surface
76 ring-shaped axial extension at the bearing block
78 ring-shaped groove at the end of the armature remote from the housing
80 first material thickness (at the attachment section of the guide sleeve)
82 second material thickness (remaining guide sleeve)
84 outer diameter of the armature in the guiding section of the guide sleeve*
86 inner diameter of the guide sleeve in the guiding section
87 outer diameter of the armature in the attachment section
88 cavity
90 inner circumferential surface of the guide sleeve
92 access opening

The invention claimed is:

1. An electromagnetic actuating device for a valve comprising:
an armature axially movably situated between two axial stops, an armature chamber being delimited by a magnet yoke;
an electrical coil coaxially encompassing the armature in the magnet yoke, and the magnet yoke being at least partially situated in a housing;
the armature having a cylindrical geometry including a base remote from the housing and, axially diametrically opposed, a hollow cylindrical end section, the base being connected to an actuating plunger, a guide sleeve being axially fitted onto the hollow cylindrical end section, and an anti-adhesion device being situated or formed at an end of the guide sleeve remote from the actuating plunger, preventing or at least impeding an axial adhesion of the armature to the magnet yoke, the guide sleeve including an attachment section having an inner circumferential surface permanently fixed to an outer circumferential surface of the armature.

2. The actuating device as recited in claim 1 wherein the guide sleeve has a guiding section for radially guiding the armature at a cylindrical inner circumferential surface of the magnet yoke and the attachment section axially connected thereto.

3. The actuating device as recited in claim 1 wherein the anti-adhesion device at the end of the guide sleeve remote from the actuating plunger is formed by a radially inwardly directed, at least in sections, circumferential contact section having at least one elevation facing away from the armature.

4. The actuating device as recited in claim 3 wherein the at least one elevation is a ring-shaped elevation extending axially in a direction of a base of a first magnet yoke segment near the housing, the first magnet yoke segment having radially inside a cup-shaped geometry forming an armature chamber for axially movably accommodating the armature.

5. The actuating device as recited in claim 1 wherein the magnet yoke is configured as two parts, including a first magnet yoke segment and a second magnet yoke segment, that the first magnet yoke segment having radially inside a cup-shaped geometry forming an armature chamber for axially movably accommodating the armature, the first magnet yoke segment forming radially outside of the armature chamber an axially open toroidal cavity for accommodating the coil, that the cavity at an open axial end being closed off by the second magnet yoke segment, and the coil being situated in the toroidal cavity.

6. The actuating device as recited in claim 5 wherein a base of the first magnet yoke segment near the housing forms a first axial stop for the armature of the two axial stops.

7. The actuating device as recited in claim 1 wherein the actuating plunger is axially movably accommodated in a sliding sleeve attached in a bore hole, coaxial to the actuating plunger, of a magnetizable bearing block, the discoidally formed bearing block being attached in a further bore hole coaxial to the actuating plunger in a base of a first magnet yoke segment of the magnet yoke remote from the housing, the bearing block closing off the armature chamber on the side of the actuating plunger and forming a second axial stop for the armature of the two axial stops.

8. The actuating device as recited in claim 1 wherein the guide sleeve is integrally manufactured from a metallic substance using the deep-drawing method.

9. The actuating device as recited in claim 1 wherein in an area of the guiding section of the guide sleeve an outer diameter of the armature is smaller than the inner diameter of the guide sleeve.

10. The actuating device as recited in claim 1 wherein in the attachment section of the guide sleeve a material thickness of the guide sleeve is reduced compared to a remaining material thickness of the remaining guide sleeve.

11. The actuating device as recited in claim 1 wherein the attachment section of the guide sleeve is rotationally and tensionally fixedly connected to the armature.

12. The actuating device as recited in claim 1 wherein an annular contact section of the guide sleeve covers an annular end face of the armature facing away from the base of the armature remote from the housing.

13. The actuating device as recited in claim 12 wherein an angle between the annular contact section of the guide sleeve and a cylindrical guiding section of the actuating device is at least 90°.

14. The actuating device as recited in claim 13 wherein the angle is greater than 90° so that the contact section runs in a conically inclined manner.

15. The actuating device as recited in claim 1 wherein an outer diameter of the armature is an area of the attachment section of the guide sleeve is equally large or smaller than an inner diameter of the guide sleeve such that the guide sleeve is press-fit to the armature.

16. The actuating device as recited in claim 1 wherein the guide sleeve is an anti-magnetic material.

17. The actuating device as recited in claim 16 wherein the anti-magnetic material is a metal.

18. The actuating device as recited in claim 16 wherein the anti-magnetic material is a plastic.

19. An electromagnetic actuating device for a valve comprising:
- an armature axially movably situated between two axial stops, an armature chamber being delimited by a magnet yoke;
- an electrical coil coaxially encompassing the armature in the magnet yoke, and the magnet yoke being at least partially situated in a housing;
- the armature having a cylindrical geometry including a base remote from the housing and, axially diametrically opposed, a hollow cylindrical end section, the base being connected to an actuating plunger, a guide sleeve being axially fitted onto the hollow cylindrical end section, and an anti-adhesion device being situated or formed at an end of the guide sleeve remote from the actuating plunger, preventing or at least impeding an axial adhesion of the armature to the magnet yoke,
- wherein the anti-adhesion device at the end of the guide sleeve remote from the actuating plunger is formed by a radially inwardly directed, at least in sections, circumferential contact section having at least one elevation facing away from the armature,
- the at least one elevation being a ring-shaped elevation extending axially in a direction of a base of a first magnet yoke segment near the housing, the first magnet yoke segment having radially inside a cup-shaped geometry forming an armature chamber for axially movably accommodating the armature.

20. An electromagnetic actuating device for a valve comprising:
- an armature axially movably situated between two axial stops, an armature chamber being delimited by a magnet yoke;
- an electrical coil coaxially encompassing the armature in the magnet yoke, and the magnet yoke being at least partially situated in a housing;
- the armature having a cylindrical geometry including a base remote from the housing and, axially diametrically opposed, a hollow cylindrical end section, the base being connected to an actuating plunger, a guide sleeve being axially fitted onto the hollow cylindrical end section, and an anti-adhesion device being situated or formed at an end of the guide sleeve remote from the actuating plunger, preventing or at least impeding an axial adhesion of the armature to the magnet yoke,
- the guide sleeve being an anti-magnetic material.

* * * * *